United States Patent
May

(10) Patent No.: US 6,904,814 B2
(45) Date of Patent: Jun. 14, 2005

(54) MAGNETIC TORQUE SENSOR SYSTEM

(75) Inventor: Lutz Axel May, Gelting (DE)

(73) Assignee: Abas, Incorporated, Chicago, IL (US)

( * ) Notice: Subject to any disclaimer, the term of this patent is extended or adjusted under 35 U.S.C. 154(b) by 0 days.

(21) Appl. No.: 10/363,886

(22) PCT Filed: Sep. 11, 2001

(86) PCT No.: PCT/EP01/10438

§ 371 (c)(1),
(2), (4) Date: Aug. 18, 2003

(87) PCT Pub. No.: WO02/23146

PCT Pub. Date: Mar. 21, 2002

(65) Prior Publication Data

US 2004/0035222 A1 Feb. 26, 2004

(30) Foreign Application Priority Data

Sep. 12, 2000 (GB) .............................. 0022315

(51) Int. Cl.⁷ .............................................. G01L 3/02
(52) U.S. Cl. ................................................ 73/862.333
(58) Field of Search ..................... 73/862.333, 862.335, 73/862.339

(56) References Cited

U.S. PATENT DOCUMENTS 5,259,252 A * 11/1993 Kruse et al. ........... 73/862.361

6,260,423 B1 * 7/2001 Garshelis ............... 73/862.336

FOREIGN PATENT DOCUMENTS

| WO | WO 99/21150 | 4/1999 |
| WO | WO 99/21151 | 4/1999 |
| WO | WO 99/56099 | 11/1999 |
| WO | WO 00/57150 | 9/2000 |

* cited by examiner

*Primary Examiner*—Edward Lefkowitz
*Assistant Examiner*—Takisha Miller
(74) *Attorney, Agent, or Firm*—Blank Rome LLP

(57) ABSTRACT

A shaft (40) subject to torque about its axis (A—A) has an axial bore (42). A region (44) of the shaft (40) has a stored magnetisation, the region (44) being permanently magnetised with circumferential magnetisation about the axis (A—A) or an annulus of longitudinal magnetisation which is preferred. The stored magnetisation emanates a torque-dependent field into the bore (42). A magnetic field sensor arrangement (50) is positioned in the bore to produce a torque-dependent signal. The disclosure discusses the relationship between the radial depth ($t_m$) of the permanent magnetisation in region (44) relative to the shaft wall thickness (t). Magnetic sensor placements include axial (52, 54) or offset arrangements of pairs of sensors (52a,b, 54,b). Dependent on the nature of the field to be sensed, sensors (5) may be oriented axially, radially or tagentially with respect to the axis (A—A).

12 Claims, 6 Drawing Sheets

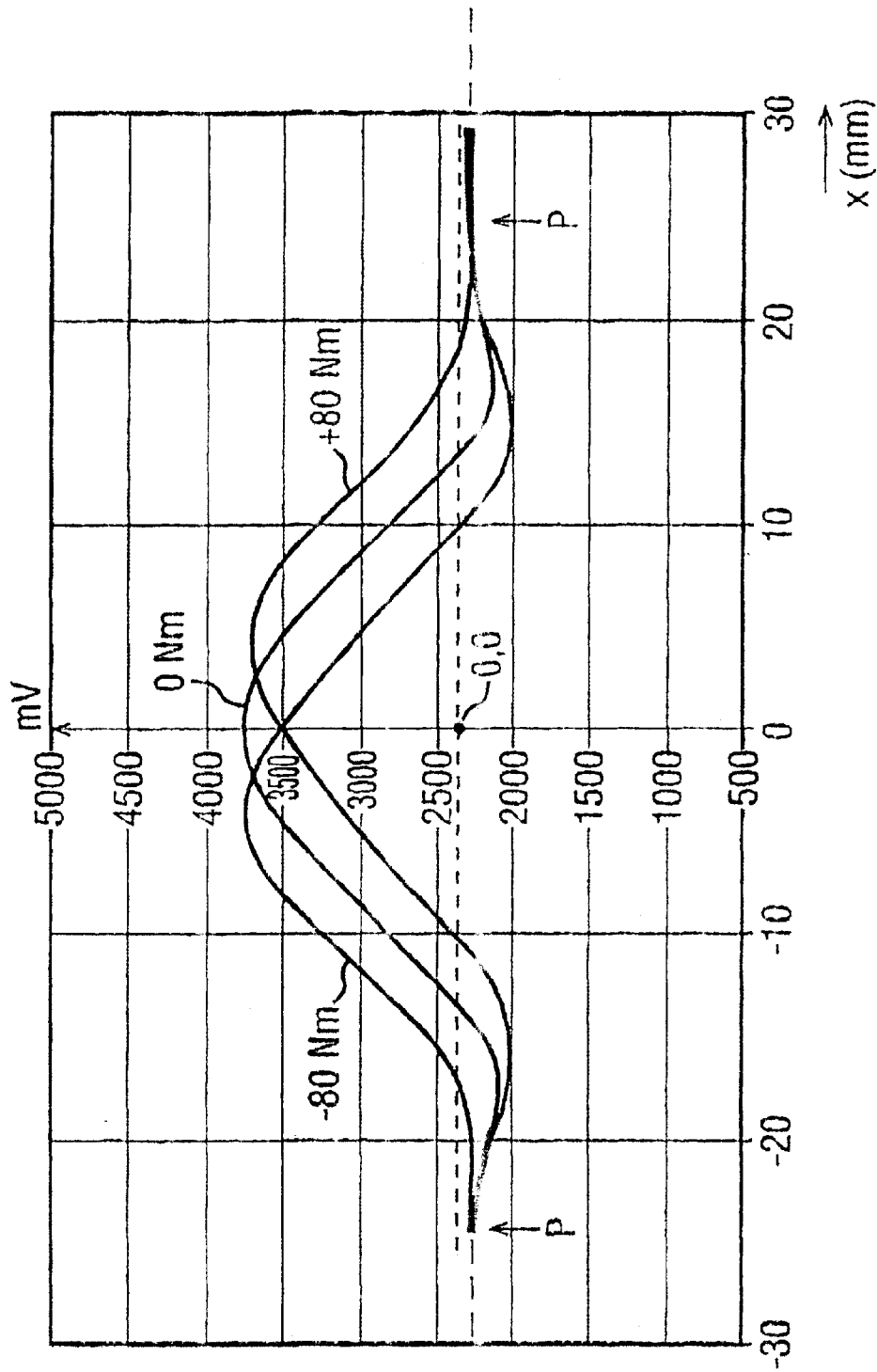

MAGNETIC TORQUE SENSOR SYSTEM

FIELD OF THE INVENTION

This invention relates to the sensing of a magnetic field and has particular application to the sensing of magnetic fields in contactless torque sensor systems for shafts and other bodies subject to torque.

BACKGROUND TO THE INVENTION

Contactless torque sensor systems are known, particularly for rotating shafts through which an applied torque is transmitted to a load. These sensor systems are contactless in that a transducer element generating a torque-dependent magnetic field rotates with a shaft. The torque-dependent magnetic field is sensed by a sensor or sensor assembly that is not in contact with the rotating parts. The transducer element is responsive to the torque in the shaft and may be integral with the shaft or an element attached to it in such a way as to receive torque established in the shaft.

Recent developments of this kind of torque sensor system have arisen in connection with transducer elements that are integral portions of the shaft. One form of magnetisation proposed for the integral portion of the shaft is circumferential magnetisation which is disclosed in published International patent applications WO99/21150 and WO99/21151, and also in WO99/56099. In circumferential magnetisation of a magnetoelastic material, a closed loop or annulus of magnetisation extends around the axis of the shaft with the magnetisation being in the circumferential direction. Normally no exterior magnetic field is emanated under no-torque condition. Relying on the phenomenon of magnetoelasticity, a torque-dependent magnetic field is emanated in a generally axial direction when the shaft is put under torque and is sensed by an external sensor located radially-outwardly of the shaft. It is possible to generate a usable zero-torque emanated field by taking special measures such as are disclosed in PCT application PCT/GB00/01103 published as WO00/57150.

Still more recent developments have proposed a form of magnetisation of an integral portion of a shaft which is described as longitudinal magnetisation. That is the magnetisation extends in the axial direction but still lies in an annulus about the axis. In contrast to circumferential magnetisation the magnetisation direction is axial so that North and South poles exist for the magnetised portion and an external fringe field exists for even the zero-torque condition. However, normally the field is predominantly closed within the lower reluctance path provided by the interior of the shaft as will be further explained below. What matters is a toroid of magnetic flux which comprises an outer portion extending from the surface which is magnetised to remanence as a permanent magnet and an inner portion which provides a path for closing the flux generated by the outer portion.

Longitudinal magnetisation has so far been exploited in two forms. In a first form, torque generates a circumferentially or tangentially directed exterior component of the field which is sensed as a measure of torque. In a second form, a torque-dependent shift of the exterior axial field is utilized and is sensed by means of the shift of the axial profile of the radial or axial component of the field. It has been discovered that the profile-shift form of longitudinal magnetisation does not generate a measurable tangential component. These two forms of longitudinal magnetisation are described more fully below. They are disclosed in International patent application PCT/GB00/03119 published under the number WO01/13081 and in International patent application PCT/EP01/04077 published under the number WO01/79801.

For convenience the above first and second forms of longitudinal magnetisation may be referred to as "circumferential sensing longitudinal magnetisation" and "profile-shift longitudinal magnetisation" respectively.

What all the above three forms or modes of magnetisation have in common is that the magnetisation is established as an annulus about the axis of rotation of the shaft and the magnetically active region—the region supporting the toroid of flux in the cases exemplified above—extends from the surface of the shaft or other rotating body radially inwardly towards the axis. The magnetically active region may not reach the axis and it is possible to utilize a shaft having an axial bore without detriment. What is also common in magnetic torque transducer systems using any of the three forms of magnetisation discussed above is that the magnetic field sensor or sensors are placed exteriorly of the shaft. In certain engineering applications a hollow shaft is employed. It may well prove desirable to locate a sensor system within the hollow of the shaft rather than exteriorly of the shaft.

There will be described hereinafter embodiments of the present invention which meet the above need.

SUMMARY OF THE INVENTION

The invention is based on the concept that a hollow part, such as a hollow shaft, has a wall section of ferromagnetic material internally bounded by a bore. For example a shaft may have an axial bore therein. The bore may be a through bore or a blind bore. A magnetically active region of the wall section emanates a magnetic field that extends into the hollow, e.g. the bore, and that is a function of a torque or force applied to the part. The magnetically active region may be provided by a region of stored magnetisation, that is a region having a permanent magnetisation. The magnetically active region may be one magnetised with a circumferential magnetisation or with one or other of the forms of longitudinal magnetisation discussed above. The torque or force dependent field is detected by a magnetic field sensor or sensor arrangement positioned within the bore. The magnetically active region may also be established by other means, e.g. an active source by which the region is magnetised to provide the desired force or torque-dependent field within the hollow.

Aspects and features of this invention are set forth in the claims following this description.

The invention will be particularly described in relation to measuring torque about the axis of a shaft of circular cross-section having a coaxial bore therein. Other shaft cross-sections are feasible and the bore may be off-set from the shaft axis. The shaft may also be a split shaft, that is longitudinally split so that its cross-section is not completely closed.

In order that the invention and its practice may be better understood, it will be further described with reference to the accompanying drawings.

BRIEF DESCRIPTION OF THE DRAWINGS

FIGS. 6a and 6b illustrate a profile of the axial and radial component respectively of the external magnetic flux as a function of axial position, and with profile shift being illustrated by the profile under zero-torque and applied torque conditions;

THE FORMS OF MAGNETISATION

Figure 1A:
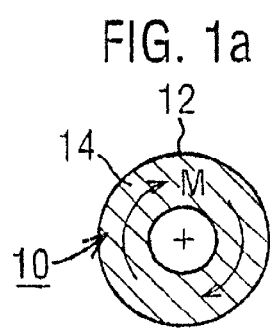
FIGS. 1a and 1b show a cross-section and an axial sections respectively of a transducer element established in a circumferentially magnetised, integral portion of a shaft of circular cross-section.

FIG. 1 shows at a) and b) circumferential magnetisation applied to an integral portion of a shaft 10 of circular cross-section. The shaft is of ferromagnetic material exhibiting magnetoelasticity. The magnetised portion 12 of the shaft is magnetised in a continuous loop in an annular portion 14 so that the magnetic field indicated by solid line M is entirely contained within the shaft. When torque is applied about shaft axis A—A, this internal field becomes skewed as indicated by dashed line M' to generate axially-separated North and South poles between which an external axially-directed flux 16 extends. The polarity of the poles depends on the direction of torque and the external magnetic field strength is a function of torque. This field 16 can be sensed by an external non-contacting magnetic field sensor 18. The sensor 18 may be of various types, for example Hall effect devices, magnetoresistive devices and saturating inductor type devices. A preferred circuit for the latter type of device is disclosed in published PCT application WO98/52083. Sensors may have directional properties and thus need to be aligned with the field component to be measured for optimum results.

Further information on circumferential magnetisation, its implementation and practice can be found in U.S. Pat. Nos. 5,465,627, 5,351,555, 5,520,059 and 5,708,216 (Garshelis) and in papers published by the Society of Automotive Engineers (SAE), such as papers 920707 and 950536 published in the SAE Technical Paper Series in 1995. A number of earlier proposals for using circumferential magnetisation involved a transducer element in the form of a thin ring secured to the shaft under torque. Above-mentioned publication WO99/56099 discloses circumferential magnetisation being established in an annulus around the axis of an integral portion of a shaft, the annulus extending to a substantial depth within the shaft. This is the case illustrated in FIG. 1a).

Figure 2:
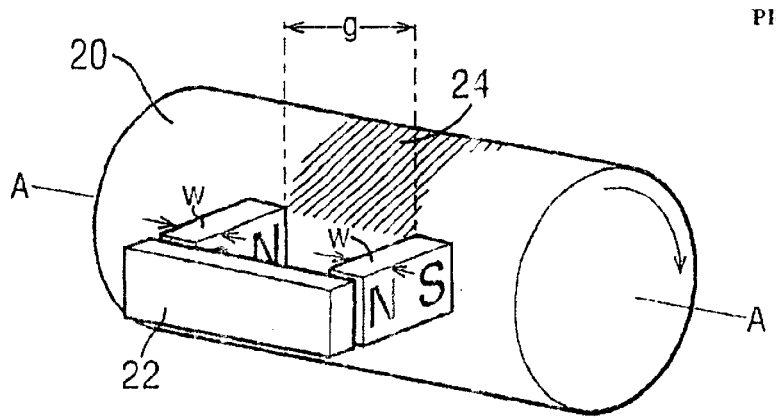
FIG. 2 shows one form of magnetising arrangement for providing a transducer element by magnetising an integral portion of a shaft of circular cross-section to have the first form of longitudinal magnetisation mentioned above.

Longitudinal magnetisation is a more recent development by the present Applicant. The shaft is of ferromagnetic material, at least in the transducer region. It may or may not exhibit significant magnetoelasticity. FIG. 2 shows a magnetising arrangement in which a shaft 20 is rotated about its axis A—A relative to a magnet 22 having its poles axially spaced and located closely adjacent the shaft. The relative rotation causes the creation of an annular zone 24 of magnetisation which extends radially inwardly from the shaft surface and which acts as a torque transducer element. In this embodiment the gap g between the poles is significantly larger than the width w of the poles, e.g. g/w≈3. This influences the field established in the shaft and the flux distribution associated with it.

Figure 3A:
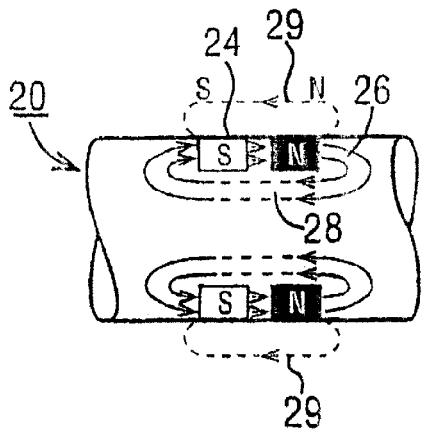
FIG. 3a illustrates the toroidal flux distribution associated with that transducer element created by the magnetisation of FIG. 2.
Figure 3B:
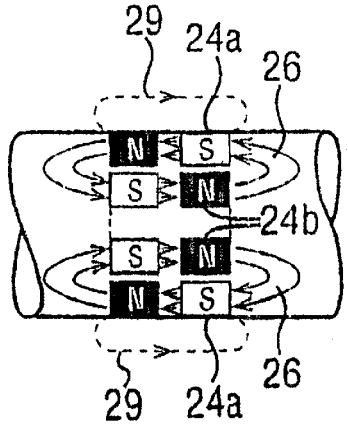
FIG. 3b illustrates the toroidal flux distribution associated with a modified two stage, magnetising procedure.

FIG. 3a is an axial section of shaft 20 indicating that a toroidal flux distribution 26 is obtained extending through the magnetized zone 24 adjacent the shaft surface and an interior path 28. Although most of the flux lies in the closed toroidal path within the shaft, some will link the poles exteriorly of the shaft as indicated at 29. FIG. 3b shows a modification in which by magnetising the shaft in two stages, two zones 24a and 24b of opposite polarity are obtained through which a common toroidal flux distribution 26 extends. The annular zone 24a extends inwardly from the surface of shaft 20 with the zone 24b being an annulus radially inward of zone 24a.

Figure 4:
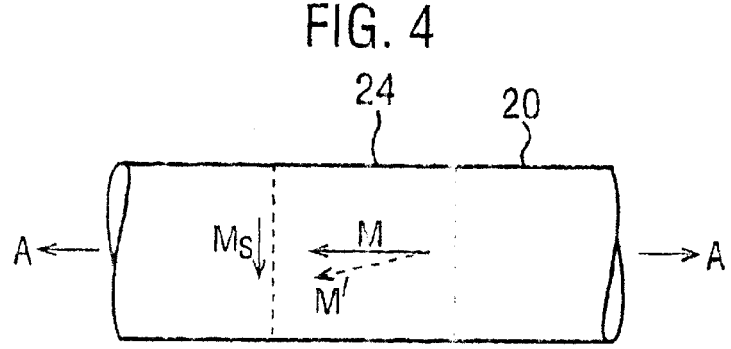
FIG. 4 is a diagrammatic exterior view of the shaft illustrating the longitudinal magnetic field (M) under no-torque (full line) and applied torque (dashed line) conditions respectively.

FIG. 4 shows diagrammatically the axially-directed magnetisation M in shaft 20 under no torque. The application of torque to the shaft about axis A—A causes the direction of magnetisation M to skew from the initial direction as indicated by M' and a tangential or circumferential component Ms is generated as a function of torque. The direction of skew and of Ms is dependent on the direction of the applied torque.

This is the first form of magnetisation referred to above as circumferential-sensing longitudinal magnetisation. The axially-directed component of the external field may also be measured, particularly for use as a reference signal. It is more fully discussed in above-mentioned published International patent application WO01/13081.

Figure 5:
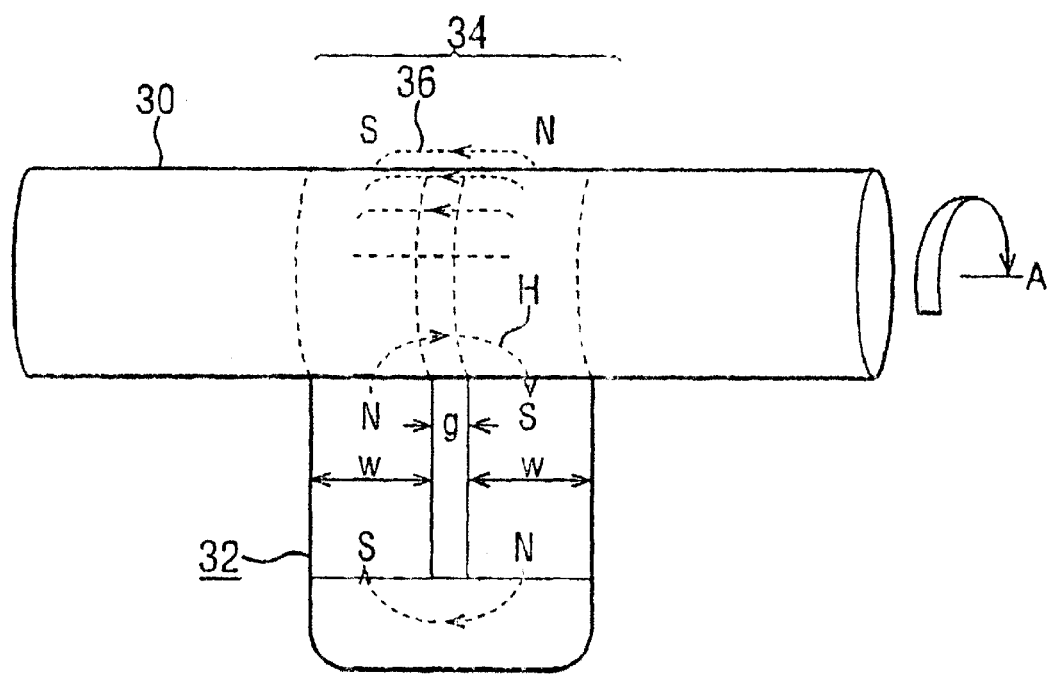
FIG. 5 shows one form of magnetising arrangement providing a transducer element by magnetising an integral portion of a shaft of circular cross-section to have the second form of longitudinal magnetisation mentioned above.

A second form of longitudinal magnetisation is generated by a magnetising arrangement such as illustrated in FIG. 5. A shaft 30 is rotated about its axis A—A relative to a U-shape (horseshoe) magnet 32 closely adjacent an integral zone 34 of the shaft. In contrast to magnet 22 of FIG. 2, magnet 32 has a pole width w in the axial direction which is substantially larger than the gap g between the North and South poles. The field (H) induced in the zone 34 is stronger over the axial length of the zone. Furthermore, if the actual physical value of the width w is greater than that in FIG. 2, the field will extend more deeply into the shaft to induce a permanent remanent magnetisation. If the gap g is small the magnetisation will extend over the annular zone of axial length and radial depth of about 2 w.

By way of example, the magnet 22 of FIG. 2 and the magnet 32 of FIG. 5 can both use pole pieces of high magnet strength providing the legs of a horseshoe or U-shaped magnet structure and connected to a low reluctance part (flux concentrator) forming the base of the U-structure. Experiments have been performed using pole pieces having a cross-section of 10×3 mm. In FIG. 2, the 3 mm. dimension was placed axially (the 10 mm. dimension being tangential to the shaft). The spacing g between the pole pieces was about 10 mm. In FIG. 5 the orientation of the pole pieces relative to the shaft was turned 90° to have the 10 mm. dimension axially directed and the 3 mm. dimension tangential. The spacing between the pole pieces was about 2 mm. to obtain a field distribution that was closed 38 by the adjacent material of the shaft.

The magnetic properties of the magnetised zone 34 of the FIG. 5 configuration as a transducer element are very different from those of the zone 24 notwithstanding that in both cases there is created a longitudinally magnetised annular zone of magnetisation which forms a toroidal flux distribution within the shaft extending from the surface inwardly.

FIG. 6a is a plot (referred to as a profile) of the resultant external magnetic field 36 emanated by the transducer element as a function of axial displacement x from the centre of the annular zone. More exactly FIG. 6a is a profile of the axial component of that field as measured with a sensor oriented axially and moved lengthwise of the shaft closely adjacent the surface. A sensor such as one of the saturating inductor type has a broad angle of response with a radial null in this case.

FIG. 6a shows three profiles taken at zero torque (0 Nm) and two oppositely directed torques (±80 Nm). What is remarkable is the axial shift of the profile as a function of torque, a shaft that is an essentially linear function of torque over a certain range. Thus one or more axial sensor(s) located at an appropriate axial point or points can be used in a contactless torque measurement system.

Figure 6B:
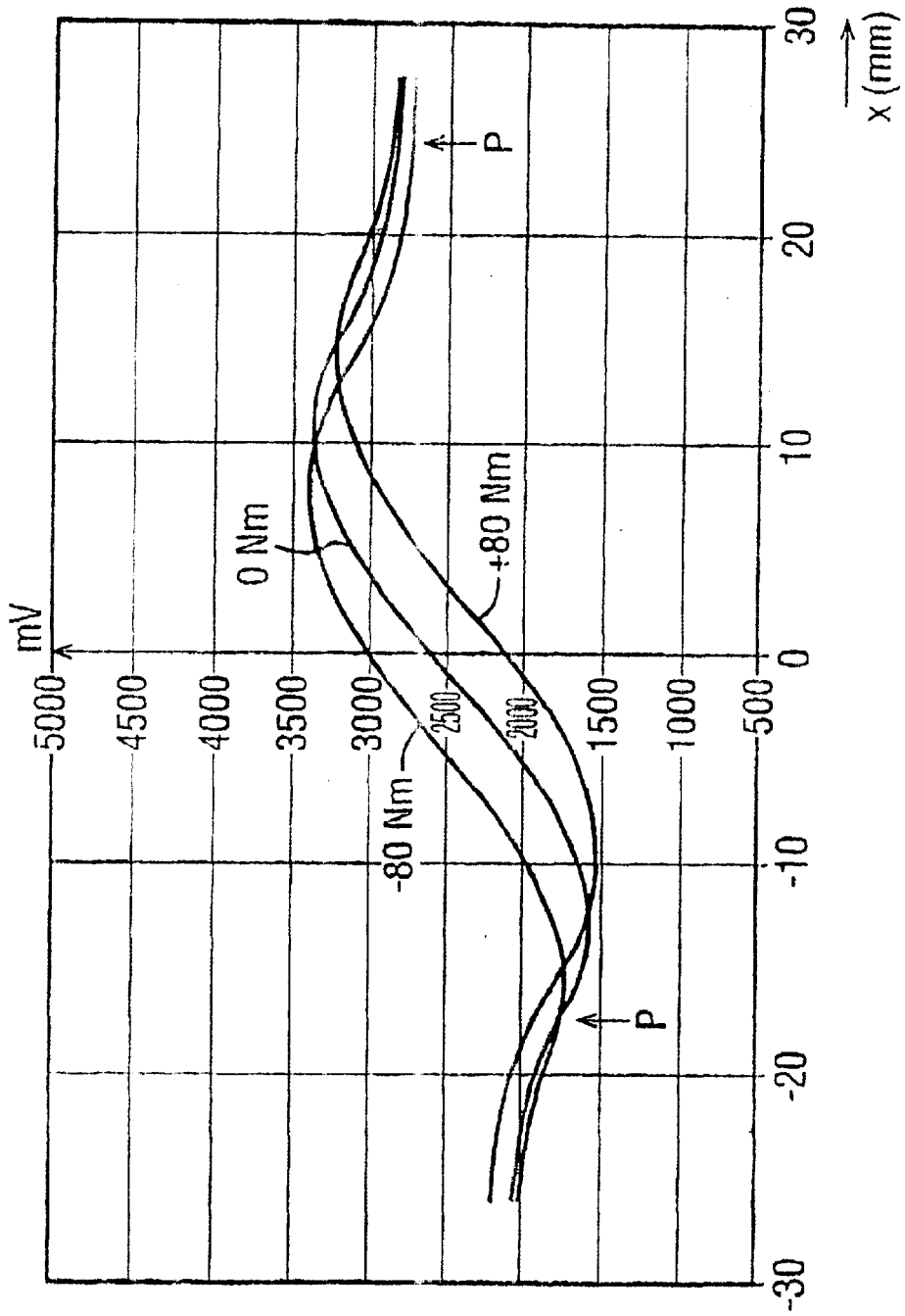

FIG. 6b is a similar set of three profiles for the radial component of the external field. In this case the sensor orientation provides a null in the axial direction. The profiles have a different shape but also show a torque-dependent shift which can be exploited to provide a contactless torque measurement system.

Although not graphically shown, it has been found that a measurement of the tangential or circumferential component of the external field of transducer element 34 to provide a profile of the tangential component as a function of axial displacement of a tangentially-oriented sensor, failed to detect any usable tangential component.

The form of magnetic response to torque illustrated in FIGS. 6a and 6b demonstrate the profile-shift longitudinal magnetisation referred to above. Further discussion of this form of magnetisation and its practical implementation is to be found in above-mentioned International patent application PCT/EP01/04077 published under the number WO01/

The description thus far has outlined the main features of three forms of magnetisation (circumferential magnetisation, circumferential-sensing longitudinal magnetisation and profile-shift longitudinal magnetisation) usable in creating transducer element for torque measurement systems. This discussion has so far described how the fields resulting from these different magnetsations are detectable and measurable exteriorly of a shaft, that is radially outwardly of the shaft adjacent its surface.

DESCRIPTION OF EMBODIMENTS OF THE INVENTION

There will now be described how the forms of magnetisation discussed above can be utilised in making measurements interiorly of a shaft.

Figure 7:
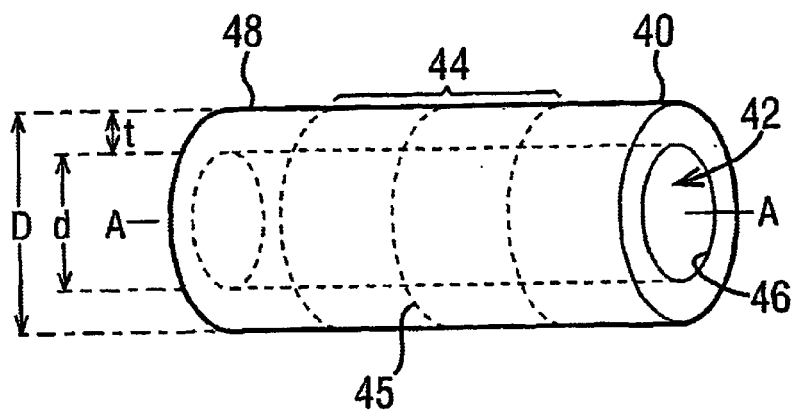
FIG. 7 shows a perspective view of a hollow shaft to which the invention is applicable.

Consideration will now be given to measurements of torque made interiorly of the shaft, such as in a shaft having an axial bore therealong. Referring to FIG. 7, this shows a hollow shaft 40 having an axial bore 42 along the shaft and a portion 44 of the shaft magnetised to provide a transducer element. The shaft may be a Nickel-steel for example. The portion 44 may be magnetised in any of the modes discussed above. It is to be assumed that two conditions are met: 1) the wall thickness of the hollow shaft is sufficient to support the mode of magnetisation in question; and 2) that the magnetisation extends sufficiently deeply to exhibit its torque-dependent characteristics in the magnetic field emanated at or adjacent the wall surface 46 of the bore. As regards condition 1), where a longitudinal magnetisation mode is employed in a thin walled tube, it may be necessary to restrict the length l of the transducer portion 44 (FIG. 7a) if the described toroidal flux distribution is to be obtained. In regard to condition 2), the transducer portion 44 will emanate at the wall surface 46 a magnetic field corresponding to that emanated at the external surface 48 of the shaft. In the bore the field pattern even though established in ambient air, say, lies radially within the material of the magnetised portion and adjacent portions of the shaft. Exterior to the shaft the field pattern is much nearer to being in a free ambient (space) condition.

Although the field within the bore exhibits torque-dependent characteristics similar to those exhibited outwardly of the shaft there are some special considerations which apply within the bore. The emanated field is confined within the volume of the bore 42 rather than extending indefinitely in theory outwardly of the shaft. In any cross-section through the bore field strength distribution with radial distance from the axis may be calculated though in the Applicant's opinion it is not clear that the text book approaches to the calculation are necessarily clear. However, practical experience with tests in relatively small bores, e.g. a few millimetres diameter, have indicated that the field is more concentrated within the bore than outside the shaft and better signal-to-noise ratios are achieved for a given magnetisation of the transducer portion 44. A further benefit is that the shaft itself assists in screening the bore from external magnetic fields acting on the shaft.

A further advantage is gained in the uniformity of the output signal with rotation of the shaft as will be explained below.

Where the requisite conditions are established within the bore, then the detection of the relevant torque-dependent field involves the same considerations as arise in detecting the external field but account needs to be taken of the relatively confined space within which measurement is to be made. It will be understood that in assessing the implementation of the invention to a particular engineering application, which is likely to prescribe one or more dimensional parameters of the shaft, there is a need to take into account the external diameter D of the shaft and the internal (bore) diameter d, and thus the wall thickness, t. Another thickness parameter is the depth of magnetisation, $t_m$, from the outer shaft surface into the wall thickness.

The parameters D and t are relevant to the establishing of the desired mode of magnetisation in the transducer region. The parameter d becomes particularly important in regard to locating a sensor system within the bore 42. The ability to do this depends on the sensor size and those of any electronics with which it is integrated. There is a move to providing integrated circuit devices into which the sensor device is incorporated. Various types of magnetic field sensor are known in the art saturating inductor, Hall effect and magnetoresistance devices are among those available. Saturating inductor devices include a magnetic-field sensitive core about which a coil is wound. A preferred form of saturating inductor circuit is described in PCT application published under the number WO98/52063. Such devices typically have dimensions of a few millimeters. For example, one saturating core device used in developing the present invention is about 6 mm. long by 2 mm. diameter. Normally two or more such devices are employed. In positioning such a device account has to be taken of its polar response pattern to the sensed magnetic field. This is usually of a figure-of-eight form with a broad maximum along the axis of the core and a relative null at right-angles to the core. Thus the orientation required of the sensor may also be important with respect to the bore diameter d.

The establishment of the appropriate mode of magnetisation within the wall thickness t of the shaft 40 will be discussed with reference to FIGS. 7a–7c.

Figure 7A:
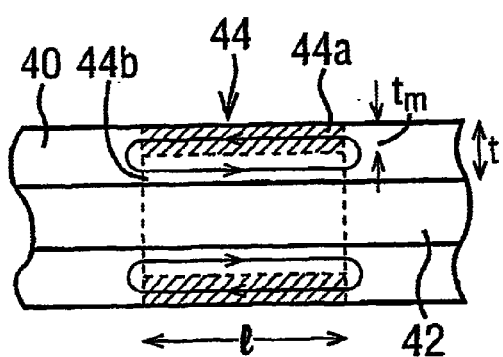
FIGS. 7a, 7b and 7c illustrate parameters relevant to the magnetisation of a transducer region of the shaft, FIGS. 7a and 7b relating to longitudinal magnetisation and FIG. 7c relating to circumferential magnetisation.
Figure 7B:
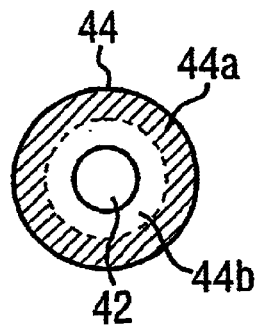

FIGS. 7a and 7b show an axial section and a cross-section respectively through a longitudinally magnetised transducer portion 44 of shaft 40. The form of magnetisation may be that described above with reference to FIG. 2–4 or FIG. 5–6b. The portion 44 is magnetised at annulus 44a, i.e. to have a remanent magnetisation, extending to a depth $t_m$ which is less than the wall thickness t. As indicated by the arrow the wall thickness 44b between $t_m$ and t from the outer surface supports a return path for the toroidal flux generated by the magnetised annulus 44a. By way of example if the wall thickness t is 6 mm. then the depth of magnetisation may be about half that, that is 3 mm. in this example. This depth of magnetisation will result in a torque-dependent internal flux within the bore 42 corresponding to that external to the surface of transducer element 44 illustrated in FIGS. 3a and 3b or in FIG. 5. As already mentioned if the wall thickness t becomes smaller, it may be necessary to restrict the length l of the transducer region to obtain the toroidal flux distribution described for the longitudinal magnetisation modes.

Figure 1B:
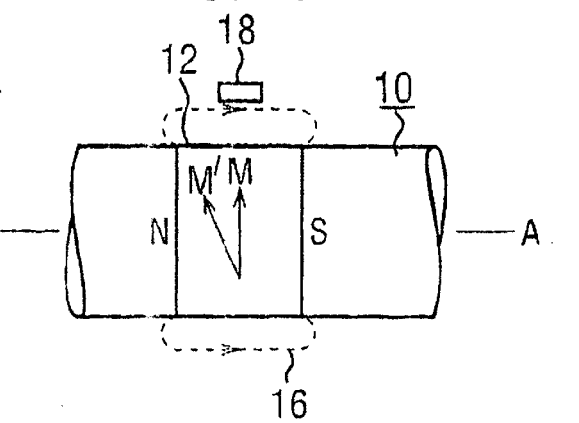
Figure 7C:
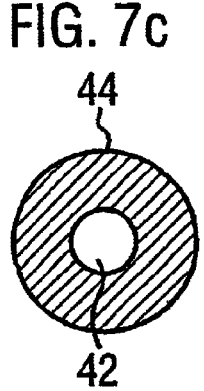

FIG. 7c shows a cross-section through a circumferentially magnetised transducer portion 44 of the kind described with reference to FIG. 1a) an b). In this case the depth of magnetisation $t_m$ should be equal to or closely approach the wall thickness t if a magnetic field is to be emanated within the bore 42 that corresponds to the external torque-dependent field 16 of FIG. 1b).

The following description of sensor placement is given with particular regard to a magnetic field sensor (MFS) of the saturating core type. More particularly the following description will assume that the transducer region 44 is magnetised in the profile-shift longitudinal magnetisation mode and that the magnetic field shift to be detected is the axial component as illustrated in FIG. 6a. It will be seen that the zero-torque response is essentially symmetrical about the 0,0 point of FIG. 6a at the centreline 45 of the transducer element. Field detection is preferred on the straight line portions of the response curve, e.g. at about ±10 mm. in FIG. 6a where it has been found that a linear transfer function exists between the applied torque and sensor output. It is preferred to combine the outputs of two sensors or sensor pairs positioned on opposite sides of centreline 45.

Figure 8:
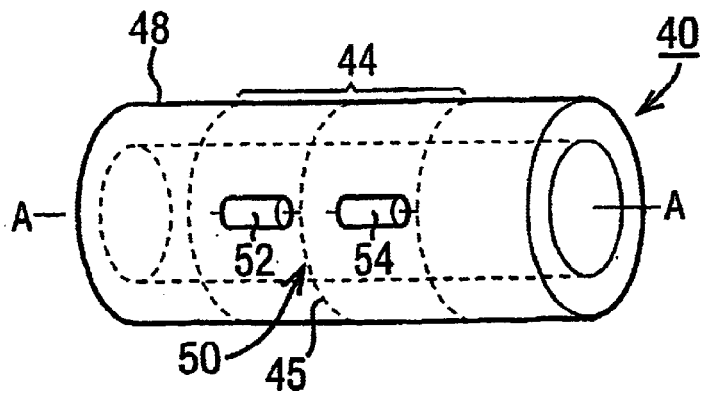
FIGS. 8 and 8a show perspective and cross-sectional views of a hollow shaft in a transducer assembly according to the invention using axially located sensor devices for detecting an axial field component.
Figure 8A:
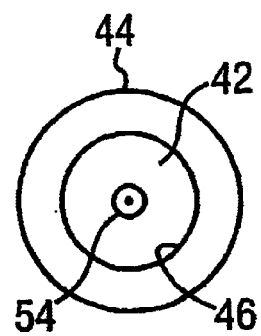

Referring now to FIG. 8 this follows FIG. 7 but shows the placement of a sensor system 50 comprising MFS 52 and MFS 54 to opposite sides of centreline 45 of a profile-shift longitudinal magnetisation transducer element 44. FIG. 8a is a cross-section of the shaft in region 44. Sensors 52, 54 are located on the axis A—A of the shaft 40, the applied torque to be sensed acting about this axis. The MFS position seen in FIGS. 8 and 8a may be referred to as the centre axial or in-line position. It has the advantage that as the shaft rotates (whether continuously or through a restricted angle) the adoption of the centre axial position has the effect of compensating for any rotational signal non-uniformities. One possible non-uniformity is that the magnetisation of the transducer element 44 is not entirely uniform about the axis A—A. A centre axial positioned MFS having a uniform response about the axis produces an output signal that is independent of the rotational angle of the shaft. Even if this ideal is not realised there will be a substantial averaging of variations which can then be further smoothed by subsequent signal processing.

Some text book calculations suggest that the field strength across the bor should be uniform so that an axial or off-axial position of the MFS should make no difference to the magnitude of the signal output. In practice it may prove desirable to position the MFS nearer the wall of the bore, that is closer to the surface from which the torque-dependent field emanates. Mechanical considerations may require off-axis placement of the sensor(s) in any event. For example if a rod extends through the bore 42 along axis A—A, the centre axial position occupied by sensors 52 and 54 in FIGS. 8 and 8a is no longer available.

Figure 9:
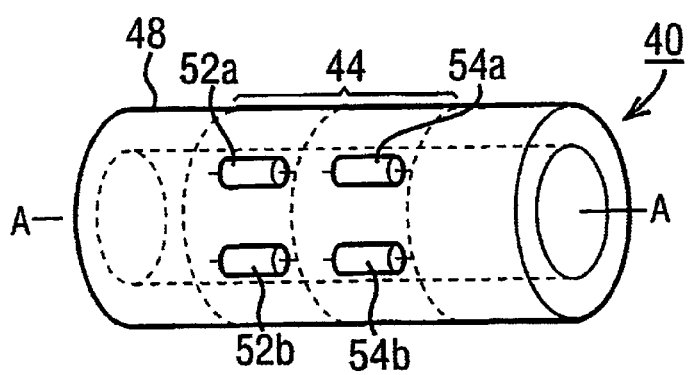
FIGS. 9 and 9a show similar views of another embodiment of a transducer assembly for detecting axially directed field components employing pairs of sensor devices that are off-axis.
Figure 9A:
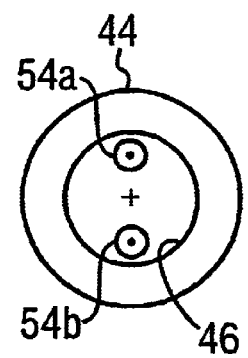

Sensors can be positioned off-axis adjacent the bore wall surface as shown in FIG. 9 and FIG. 9a. In this case it is preferred that the above-described sensors 52 and 54 at the opposite sides of the centreline 45 are replaced by a respective pair of sensors 52a, 52b and 54a, 54b. The sensors of each pair are placed diametrically opposite adjacent the bore wall surface as seen in FIG. 9a. The signals from each pair are combined to sum the torque-dependent components. This combining of the signals improves signal uniformity with rotation of the shaft. That is it effectively introduces an averaging process. More than two sensors angularly spaced from one another about the axis can be employed to enhance the averaging process and the signal uniformity with rotation. This preference does not preclude the use of one off-axis sensor at a given axial position but a wider range of signal output as a function of rotation angle is likely, thereby requiring more processing of the output signal to obtain an average value.

The foregoing embodiments show sensor orientations for detecting axially-directed field components. As such, these orientations are applicable to circumferential magnetisation and the axial profile-shift of longitudinal magnetisation (FIG. 6). Depending on the mode of the magnetisation established in transducer region 44, it may be desirable to detect radial or tangential components of the field emanated into the bore 42. Sensors may be oriented so as to be responsive to more than one of the three field components, namely axial, radial and tangential.

Figure 10A:
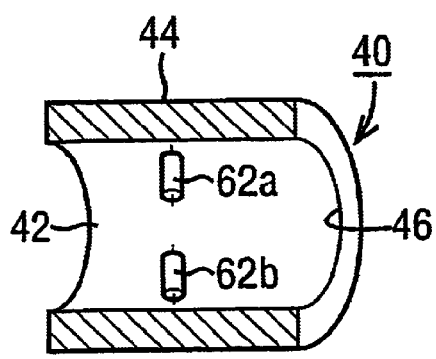
FIGS. 10a and 10b are axial sections showing a modification of the transducer assembly of FIGS. 9 and 9a for detecting radial field components with two different types of sensor.
Figure 10B:
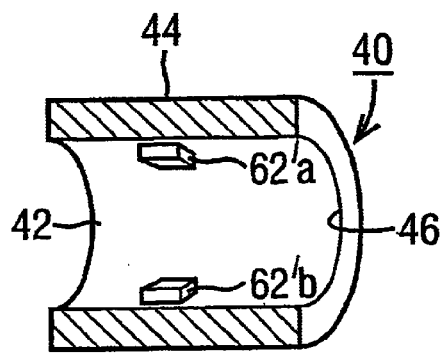
Figure 11A:
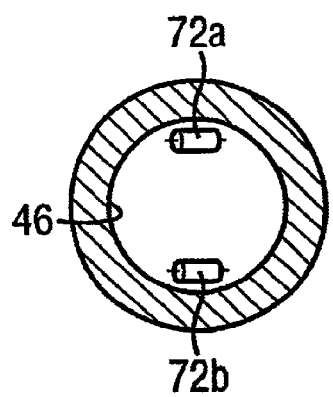
FIGS. 11a and 11b are cross- and axial sections showing a modification of the transducer assembly of FIGS. 9 and 9a for detecting tangential field components.
Figure 11B:
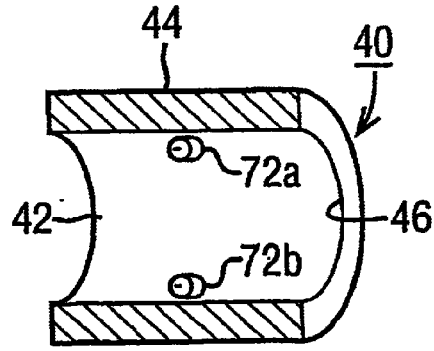

FIGS. 10a and 10b each show a pair of sensors 62a, 62b and 62'a, 62'b respectively oriented to respond to a field component in the radial direction. The sensors of each pair are located adjacent the wall surface 46 of bore 42 in region 44. FIG. 10a illustrates saturating core devices FIG. 10b illustrates solid state devices such as Hall effect chips. Solid state chips may be usable in bores too small to accommodate saturating core devices. FIGS. 11a and 11b show a pair of saturating core devices 72a, 72b located diametrically opposite adjacent the bore wall surface 46 and oriented to respond to a tangential field component.

It will be understood that the teachings of the invention are not limited to sensing by sensors located within a bore of magnetically-active transducer regions which have been magnetised in one of the three modes described above. The teachings are applicable to other ways of generating a magnetically active transducer region, including an active source acting on the transducer region, where a torque- or force-dependent magnetic field component is exhibited within the bore.

The embodiments of the invention have been described in relation to a hollow shaft of circular cross section and having a circular cross section bore therein coaxial with the shaft. It will be appreciated that the teachings of the invention may be applied with shafts and bores of other cross-sections. It is also possible to envisage hollow shafts which are longitudinally split, i.e. the wall section is not a fully closed annulus. The bore need not extend the full length of the shaft. It may be a blind bore extending through only a portion of the shaft. The teaching of the invention given above can be applied generally to a hollow part which is subject to torque about an axis extending through the hollow.

In order to obtain optimum and consistent long-term stability of performance two additional measures may be undertaken. A first is to use guard or keeper regions as disclosed in WO99/56099 above-mentioned. Guard regions may use circumferential or longitudinal magnetisation in exercising their protective function on the transducer region. A second measure is to apply a process to the shaft by which it is magnetically cleansed prior to magnetisation of the transducer region or regions and any additional guard or keeper regions. An apparatus suitable for this pre-magnetisation procedure is disclosed in above-mentioned published PCT application WO01/13081.

The disclosed apparatus comprises a demagnetising coil wound in hollow solenoid fashion, connected in series with the secondary output winding of a mains powered transformer arrangement and a current limiter. For an 18 mm. diameter shaft a suitable coil was about 300 turns of about 30 cm. diameter of a heavy current carrying capacity cable. The outer conductor of a heavy coaxial cable coiled into a solenoid coil proved to be suitable. The transformer arrangement comprises a variable transformer connected to a 110 or 240 VAC mains AC supply. This is in turn connected to an isolation transformer capable of safely delivering 10 amperes or more at its secondary at voltages at up to say 48 V. The demagnetising coil is connected to the secondary of the isolation transformer through the current limiter which may be a resistor, e.g. a power rheostat, or more elaborate electronic device. The current limiter may be omitted provided steps are taken to monitor the current through the coil. A typical coil resistance would be about 100 milliohms. The variability of the transformer arrangement enables the current to be controlled as desired.

The demagnetising coil is energised and the full length of the shaft is passed through the coil while the coil is energised at 8–10A. This produces a degaussing field of about 1 kGauss. Typically one is looking to achieve fields in the 500–1200 Gauss range. The shaft may be mounted on a movable jig to move it along the axis of the coil and the movement continues as the far end of the shaft leaves the coil so that the field to which the shaft is subjected gradually decreases. There may be other ways of achieving the degaussing procedure including control of the coil current as a function of the axial position of the shaft with respect to the coil.

Following the magnetisation of the hollow shaft to provide the transducer region(s) and guard/keeper regions (if required) a post-magnetisation step may be performed in the same manner as the pre-magnetisation procedure but at a lower level of magnetic field. In the post-magnetisation procedure, the now magnetised shaft is again passed axially through the energised solenoid coil. However, the AC current through the coil is of an order of a magnitude lower than for the pre-magnetisation procedure. In the pre-magnetisation example given above, the 8–10 A current employed for pre-magnetisation is reduced to say 0.5–1A for post magnetisation. The current is at a value which does not change the basic magnetic pattern sought to be established but, as best can be surmised, it reduces or knocks-back parasitic fields that may be present after the magnetisation procedure. It has been found that the post-magnetisation step improves the uniformity of the output signal with rotation of the shaft, offsets over time and the final sensor stability generally.

The transducer region may be protected by guard and keeper regions. This subject is discussed in relation circumferential magnetisation in above-mentioned WO99/56099. It may also be applied in connection with longitudinal magnetisation as is disclosed above-mentioned published PCT applications WO01/13081 and in International patent application PCT/EP01/04077. These additional regions can provide two functions. Firstly a transducer region can be flanked on each side by a region of similar mode of magnetisation (circumferential or longitudinal) but opposite polarity with a view to enhancing the transducer region performance. A flanking region may itself be employed as a transducer element so that the two regions act cooperatively with one another. Secondly the flanking regions are used to protect the transducer region from magnetic fields propagated in the axial direction from elsewhere in the shaft. It has been found that as regards this protective function a longitudinally magnetised transducer region can be flanked by circumferentially magnetised regions.

What is claimed is:

1. A transducer assembly for a part, for example a shaft comprising:

a hollow part providing a wall section of ferromagnetic material internally bounded by a bore, a transducer element comprising a magnetically active region of the wall section of the part, which region emanates a magnetic field that is a function of a torque or force applied to the hollow part, said torque or force dependent field extending into said bore; and a sensor arrangement located within the bore to detect said torque or force dependent field and provide a signal representing same.

2. A transducer assembly as claimed in claim 1 in which said sensor arrangement comprises at least one sensor device located centrally of said bore.

3. A transducer assembly as claimed in claim 1 in which said sensor arrangement comprises two or more sensor devices located adjacent the inner surface of said wall section and angularly spaced apart with respect to an axis extending through said bore.

4. A transducer assembly as claimed in claim 1 in which said which said magnetically active region comprises an annulus of magnetization.

5. A transducer assembly as claimed in claim 4 in which said magnetically active region supports a toroid of magnetic flux within said wall section.

6. A transducer assembly for a part, for example a shaft, comprising:

a hollow part providing a wall section of ferromagnetic material internally bounded by a bore, said part being subject to a torque acting about an axis extending through said bore, a transducer element comprising a magnetically active region of the wall section of the part, which region emanates a magnetic field that is a function of the torque applied to the hollow part, said torque dependent field extending into said bore; and a sensor arrangement located within the bore to detect said torque dependent field and provide a signal representing same.

7. A transducer assembly as claimed in claim 6 which said sensor arrangement comprises at least one sensor device located on said axis.

8. A transducer assembly as claimed in claim 7 which said at least one sensor has a uniform response about said axis.

9. A transducer assembly as claimed in claim 6 in which said part is rotatable about said axis.

10. A transducer assembly as claimed in claim 6 which said sensor arrangement comprises two or more sensor devices located adjacent the inner surface of said wall section and angularly spaced apart about said axis.

11. A transducer assembly as claimed in claim 10 which said sensor devices are oriented to be responsive to a radial field component or to a tangential or circumferential field component or to an axially-directed field component.

12. A transducer assembly as claimed in claim 10 in which said part is rotatable about said axis.

* * * * *